United States Patent
Mart et al.

(10) Patent No.: US 11,520,787 B2
(45) Date of Patent: Dec. 6, 2022

(54) PREDICTIVE QUERY IMPROVEMENT

(71) Applicant: ServiceNow, Inc., Santa Clara, CA (US)

(72) Inventors: Josef Mart, San Marcos, CA (US); Joseph Michael Davis, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 147 days.

(21) Appl. No.: 17/061,042

(22) Filed: Oct. 1, 2020

(65) Prior Publication Data

US 2021/0019317 A1 Jan. 21, 2021

Related U.S. Application Data

(63) Continuation of application No. 15/814,132, filed on Nov. 15, 2017, now Pat. No. 10,795,885.

(51) Int. Cl.
*G06F 17/30* (2006.01)
*G06F 16/2453* (2019.01)

(52) U.S. Cl.
CPC .... *G06F 16/24537* (2019.01); *G06F 16/2454* (2019.01); *G06F 16/24544* (2019.01)

(58) Field of Classification Search
CPC ........ G06F 16/13; G06F 16/24; G06F 16/156; G06F 16/2453; G06N 3/00; G06N 5/00; G05B 13/00
See application file for complete search history.

(56) References Cited

U.S. PATENT DOCUMENTS

| | | | |
|---|---|---|---|
| 5,978,594 A | 11/1999 | Bonnell | |
| 6,321,229 B1 | 11/2001 | Goldman | |
| 6,496,816 B1 * | 12/2002 | Thiesson | G06K 9/6296 706/45 |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |

(Continued)

*Primary Examiner* — Hung D Le
(74) *Attorney, Agent, or Firm* — Fletcher Yoder PC

(57) ABSTRACT

The present approach relates to improving query performance in a database context. Examples of query improvement are described in the context of certain query patterns, one or more of which may be observed in a given query. When a given query pattern is observed, changes may be made to the query at the application or database level to improve performance of the respective query. Query improvements may be performed in a manner transparent to the user.

18 Claims, 11 Drawing Sheets

(56) References Cited

U.S. PATENT DOCUMENTS

| | | |
|---|---|---|
| 7,877,783 B1 | 1/2011 | Cline |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangaranjan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 2011/0055199 A1* | 3/2011 | Siddiqui ............ G06F 16/2456 707/E17.017 |
| 2013/0124500 A1* | 5/2013 | Beavin ............ G06F 16/24534 707/E17.017 |
| 2014/0095469 A1* | 4/2014 | Chen ................ G06F 16/2453 707/E17.054 |
| 2014/0156633 A1* | 6/2014 | Duan ................ G06F 16/9024 707/713 |
| 2017/0147644 A1* | 5/2017 | Lee ........................ G06F 16/00 |
| 2018/0060389 A1* | 3/2018 | Hwang ............ G06F 16/24542 |
| 2018/0067988 A1* | 3/2018 | Baars ................ G06F 16/2455 |
| 2018/0075102 A1 | 3/2018 | Oppenheimer et al. |

\* cited by examiner

PREDICTIVE QUERY IMPROVEMENT

CROSS-REFERENCE

This application is a continuation of U.S. patent application Ser. No. 15/814,132, filed Nov. 15, 2017, and entitled, "PREDICTIVE QUERY IMPROVEMENT," which is herein incorporated by reference in its entirety for all purposes.

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of data may be organized and stored in databases that are created, stored, and maintained on different types of computer-based systems. Such databases may be used to store data ranging from personal information or data developed in large-scale industrial, commercial, and governmental contexts. Thus, such stored data sets may range from the trivially small in size to those that may encompass tens millions of records and data points, or more. As the number of records and the number of defined fields within a database grow in number however, the manner in which such data is managed, manipulated, updated, or accessed, may become more complex.

By way of example, certain types of operations, such as queries, may involve identifying or manipulating some subset of records stored within a database. The manner in which the subset of records is accessed, however, may involve reviewing a substantially larger number of records than is within the subset, such as scanning an entire table in one scenario, and may be inefficient in terms of time and system resources.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approaches generally relate to the alteration, re-writing, or translation of an initial query instruction or instructions into an alternative form which, when executed, runs faster, more efficiently, and/or with fewer computational resources than the initial formulation. Examples of this approach include, but are not limited examples discussed herein, which include: (1) improvement of query language having targeted element-value CONTAINS type expressions; (2) improvement of query language that includes left join expressions to be rewritten as inner joins where appropriate; and (3) re-writing OR expressions, where appropriate, using UNION expressions.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in greater detail below, the present approach improves the query performance of a database in a manner that is transparent to a user. Such queries typically relate to the selection or manipulation of a subset of records stored within one or more tables of the database and may correspond to activities such as reading, updating, or deleting the specified records or portions (e.g., select fields) of the specified records. The present approach identifies various scenarios or configurations for ad hoc queries that would typically be run against a full table (i.e., a full table scan), and thus may be resource intensive and/or slow to execute, such as taking from five to twenty seconds to return results. In particular, contexts in which multiple joins are performed to select the records specified by the query may be particularly resource intensive and slow to execute.

The present approach identifies patterns in a given query and, for a given recognized pattern, enhances the query to limit the number of rows scanned, thereby reducing the resources needed for query execution for these identified query patterns and improving the speed and efficiency of the respective query.

Figure 1:
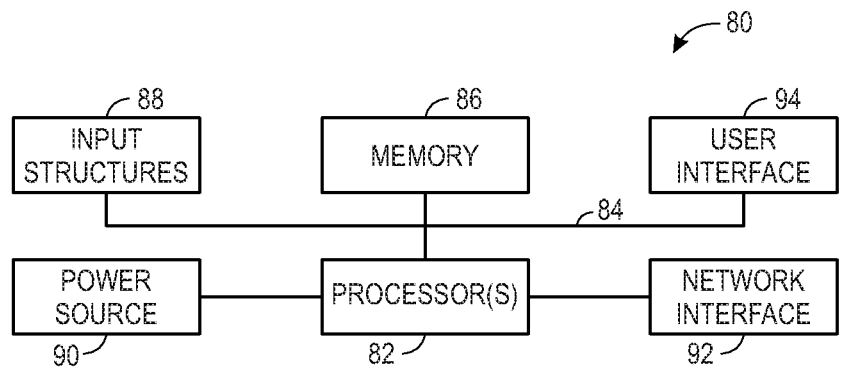
FIG. 1 is a block diagram of a computing device utilized in a distributed computing system of FIG. 1, in accordance with aspects of the present disclosure.

With this in mind, and by way of background, it may be appreciated that the present approach may be implemented using a processor-based system such as shown in FIG. 1. Likewise, the databases to which the present approach applies may be stored and maintained on such a processor-based system.

Such a system may include some or all of the computer components depicted in FIG. 1. FIG. 1 generally illustrates a block diagram of example components of a computing device 80 and their potential interconnections or communication paths, such as along one or more busses. The computing device 80 may be an embodiment of a client, an application server, a database server, and so forth, as discussed in greater detail below. As used herein, a computing device 80 may be implemented as a computing system that includes multiple computing devices and/or a single computing device, such as a mobile phone, a tablet computer, a laptop computer, a notebook computer, a desktop computer, a server computer, and/or other suitable computing devices.

As illustrated, the computing device 80 may include various hardware components. For example, the device includes one or more processors 82, one or more busses 84, memory 86, input structures 88, a power source 90, a network interface 92, a user interface 94, and/or other computer components useful in performing the functions described herein.

The one or more processors 82 may include processor(s) capable of performing instructions stored in the memory 86. For example, the one or more processors 82 may include microprocessors, system on a chips (SoCs), or any other performing functions by executing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86. Moreover, the functions of the one or more processors 82 may be distributed across multiple processors in a single physical device or in multiple processors in more than one physical device. The one or more processors 82 may also include specialized processors, such as a graphics processing unit (GPU).

The one or more busses 84 include suitable electrical channels to provide data and/or power between the various components of the computing device. For example, the one or more busses 84 may include a power bus from the power source 90 to the various components of the computing device. Additionally, in some embodiments, the one or more busses 84 may include a dedicated bus among the one or more processors 82 and/or the memory 86.

The memory 86 may include any tangible, non-transitory, and computer-readable storage media. For example, the memory 86 may include volatile memory, non-volatile memory, or any combination thereof. For instance, the memory 86 may include read-only memory (ROM), randomly accessible memory (RAM), disk drives, solid state drives, external flash memory, or any combination thereof. Although shown as a single block in FIG. 1, the memory 86 can be implemented using multiple physical units in one or more physical locations. The one or more processors 82 access data in the memory 86 via the one or more busses 84.

The input structures 88 provide structures to input data and/or commands to the one or more processor 82. For example, the input structures 88 include a positional input device, such as a mouse, touchpad, touchscreen, and/or the like. The input structures 88 may also include a manual input, such as a keyboard and the like. These input structures 88 may be used to input data and/or commands to the one or more processors 82 via the one or more busses 84 and, in the current context, may be used by a user to enter, select, or configure a query operation.

The power source 90 can be any suitable source for power of the various components of the computing device 80. For example, the power source 90 may include line power and/or a battery source to provide power to the various components of the computing device 80 via the one or more busses 84.

The network interface 92 is also coupled to the processor 82 via the one or more busses 84. The network interface 92 includes one or more transceivers capable of communicating with other devices over one or more networks (e.g., a communication channel). The network interface 92 may provide a wired network interface or a wireless network interface. The computing device 80 may communicate with other devices via the network interface 92 using one or more network protocols.

A user interface 94 may include a display that is configured to display text or images transferred to it from the one or more processors 82. By way of example, in the present context, the user interface may be used to provide a set of query results (e.g., selected database records) to a user. In addition and/or alternative to the display, the user interface 114 may include other devices for interfacing with a user, such as lights (e.g., LEDs), speakers, and the like.

Figure 2:
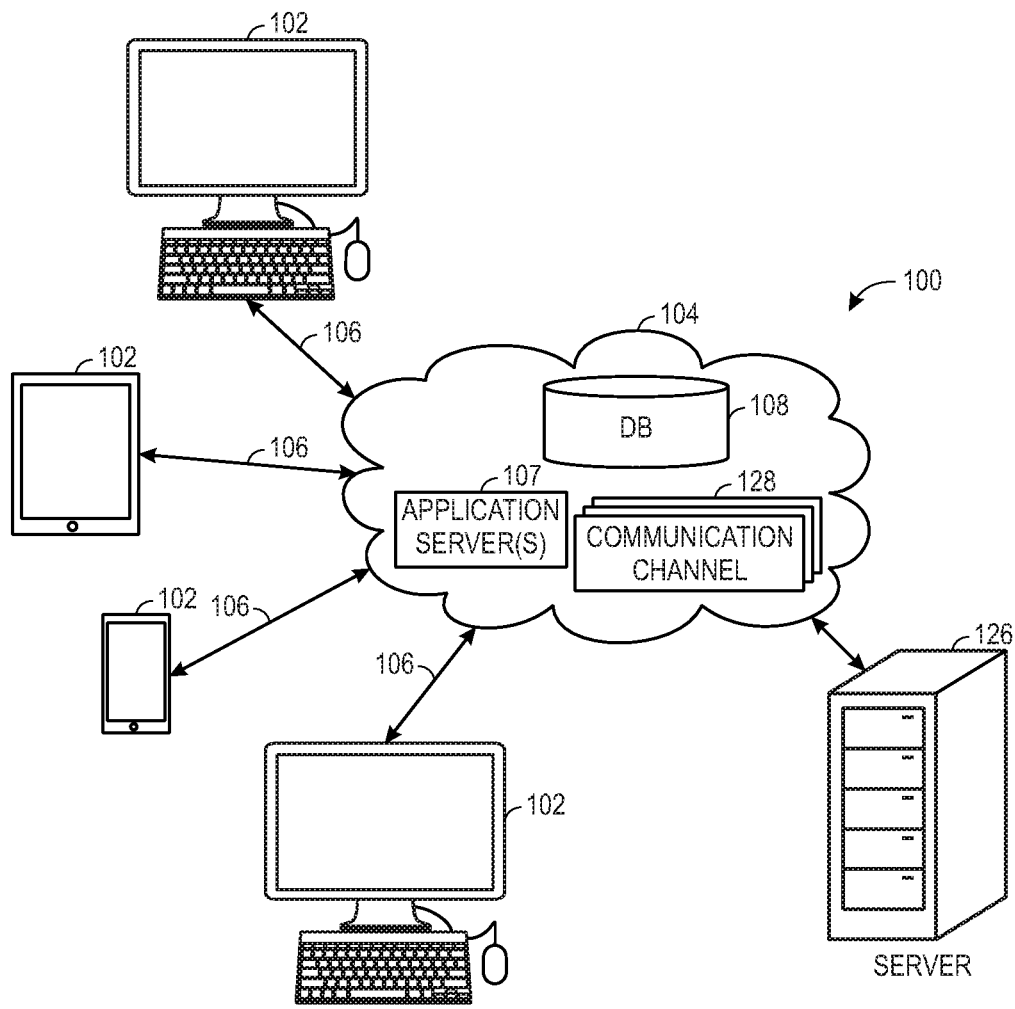
FIG. 2 is a block diagram of a distributed computing system, in accordance with aspects of the present disclosure.

A real-world context in which processor-based systems, such as the computing device 80 of FIG. 1, may be employed to implement the present approach, is shown in FIG. 2. In this example, a number of computing devices are employed to implement a distributed computing framework 100, shown as a block diagram in FIG. 2, in which certain of the constituent devices may maintain or interact with a database in accordance with the approach discussed herein.

In this example, one or more clients 102 communicate with a platform (e.g., a cloud service) 104 over a communication channel 106. Each client 102 may include any suitable computing system, such as a mobile phone, a tablet computer, a laptop computer, a notebook computer, a desktop computer, or any other suitable computing device or combination of computing devices. Each client 102 may include client application programs running on the computing devices. In the present example, one or more of the clients may be suitable for implementing a query of a database (e.g., database 108) accessible on the distributed computing framework 100, and or for displaying or receiving results of such a query.

The platform (e.g., a cloud service) 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only four clients 102 are shown connected to the platform 104 in the depicted example, it should be noted that platform 104 may connect to any number of clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The DB 108 may include a configuration management database (CMDB) that includes a series of tables containing information about assets and services controlled by a client 102 and the configurations of these assets and services. The assets and services may include records of computers or other devices on a network (or group of networks), software contracts and/or licenses, enterprise services, hardware resources (such as server computing devices, client computing devices, processors, memory, storage devices, networking devices, or power supplies), software resources (such as instructions executable by the hardware resources including application software or firmware), virtual resources (such as virtual machines or virtual storage devices), and/or storage constructs (such as data files, data directories, or storage models). Though a CMDB is provided as an example of one type of database that may be present within the computing framework shown in FIG. 2, as use herein a database 108 may be any type of database suitable for being queried and/or may store any suitable type of information.

Additional to or in place of the DB 108, the platform 104 may include one or more other database servers. The database servers are configured to store, manage, or otherwise provide data for delivering services to the client 102 over the communication channel 106. The database server includes one or more databases (e.g., DB 108) that are accessible by the application server 107, the client 102, and/or other devices external to the databases. In some embodiments, more than a single database server may be utilized. Furthermore, in some embodiments, the platform 104 may have access to one or more databases external to the platform 104 entirely, such as a database stored or otherwise present on a client 102.

Access to the platform 104 is enabled by a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on a network that communicates with the platform 104.

With the preceding system and device level background in mind, the present approach relates to approaches for improving query performance, such as for improving the performance of read, update, or delete queries, that may be implemented on a processor-based system and in a distributed environment as discussed with respect to FIGS. 1 and 2. To facilitate explanation and to provide a useful real-world context, a database in the form of a CMDB, as discussed above, may be referenced as an example in certain instances. However, it should be understood that the present approach may be applied to other suitable databases and is not limited to CMDB implementations or to other database examples referenced herein.

A database as discussed herein may consist of a number of tables, which are often defined based on some logical characteristic common to the records stored in the table (e.g., address information in an address table of a mailing database, error events in an error table of an event log, vehicles in a vehicle table of a registration database, and so forth). Each table in turn is characterized by a number of records for which one or more different types of data are stored in respective fields of the table. By way of example, in a vehicle registration database one table may have a record for each registered vehicle, with each vehicle record having associated fields for storing information specific to the respective vehicle (e.g., vehicle year, make, model, color, identification number, and so forth). In such an example, other tables may exist in the same database containing owner information, accident information, repair history, recall notices and so forth, with each table having its own set of records which in turn have respective fields related to the records within that table. In a relational database context, these tables may be linked together based on known relationships between tables (e.g., between owners and vehicles), allowing the stored data to be accessed or manipulated in useful ways.

Typically each table is indexed by one or more fields of the respective table. Use of such indexes allows the records of the table to be more readily searched, manipulated, or otherwise accessed. For the purpose of explanation and visualization, a table may conceptualized as records in rows within the table (i.e., run vertically within the table) and the different fields of data for each record are columns (i.e., run horizontally within the table). As will be appreciated however, such directionality and two-dimensionality is an arbitrary convention and should not be viewed as limiting.

With the preceding multi-table database framework in mind it may be appreciated that a user may routinely wish to access records to either view or retrieve data (i.e., to read the data), to change or modify records (i.e., to update the data), and or to remove records (i.e., to delete data). Such operations by a user may be performed using operations characterized generally herein as queries. Such queries may be generated ad hoc by the user and may be implemented using a common set of instructions, such as structured query language (SQL).

It is not uncommon for a user to configure an ad hoc query to select a subset of records in a database where the query, when executed, results in a full scan of a table or tables of the database. Such tables may be quite large (e.g., thousand, hundreds of thousands, millions, or tens of millions of records, by way of example) and full scans of such a table may result in query times of five to twenty seconds or more. In particular, queries that involve performing join operations between multiple tables in order to access the specified records may be particularly inefficient. For queries that are routinely run against a database, such query times may pose a regular time burden and productivity limitation on users needing to access or change the records in question.

The present approach allows for improvement of certain query inefficiencies and may improve performance by an order of magnitude for suitable queries. In the following discussion, examples of query improvement are described in the context of certain query patterns, one or more of which may be observed in a given query. When a given query pattern is observed, steps as discussed herein may be taken at the application or database level to improve performance of the respective query. Such steps may include, among others, de-normalization of the data to facilitate record selection processes to be implemented by other than full table scans and/or construction or translation of queries as multiple fast-execution statements in place of a single, complex, slowly-executed statement. Query improvements may be performed in a manner transparent to the user, who may input or configure a query in a conventional manner and the query may be parsed or translated at the application level (i.e., in-app) or database level as part of an upgrade or day-to-day operation to improve efficiency.

In a first context, queries that include a CONTAINS (value) type statement, such as a LIKE statement, are improved. By way example, the queries:

```
/task_list.do?sysparm_query=short_descriptionLIKEzboot
   SELECT count(*)
   FROM task
   WHERE short_description LIKE '%zboot%'
and
/cmdb_list.do?sysparm_query=nameLIKEdb05
   SELECT count(*)
   FROM cmdb
   WHERE name LIKE '%db05%'
``` cannot be optimized in the SQL layer by the native query optimization provided by MySQL. As a result, to find records containing the specified text or phrase (e.g., "zboot" or "db05") in the fields in question (such as an unstructured text field), the queries conventionally would need to scan every entry to find all matches.

In accordance with the present approach, queries identified as having this type of pattern (e.g., a CONTAINS (value)-type syntax or functionality) may undergo processing as described herein so at to perform more efficiently. In one implementation, improving the performance of such a query may involve de-normalizing the data in question, after which portions of the data may be stored in two different places (e.g., two-different tables), such as a source table and a term or look-up table that is smaller than the source table. As discussed below, the present approach may be more beneficial where the number of rows or records meeting the specified criterion (e.g., containing the text or phrase of interest) is small relative to the number of records in the source table, such that the term table is smaller in terms of the number of rows or records than the source table.

In one implementation, the term table may consist only of an index or identifier (e.g., sys_id) of those rows or records of the source table meeting the specified LIKE criterion or other CONTAINS(value) type formulation, i.e., having the specified value in the specified field. That is, the term table in this example is a table listing those rows or records in the source table meeting the specified CONTAINS(value) type criterion. The respective term table may be maintained and/or updated as records are added, updated, or deleted in the source table to reflect what records or rows of the source table contain the specified value in the specified field.

Figure 3:
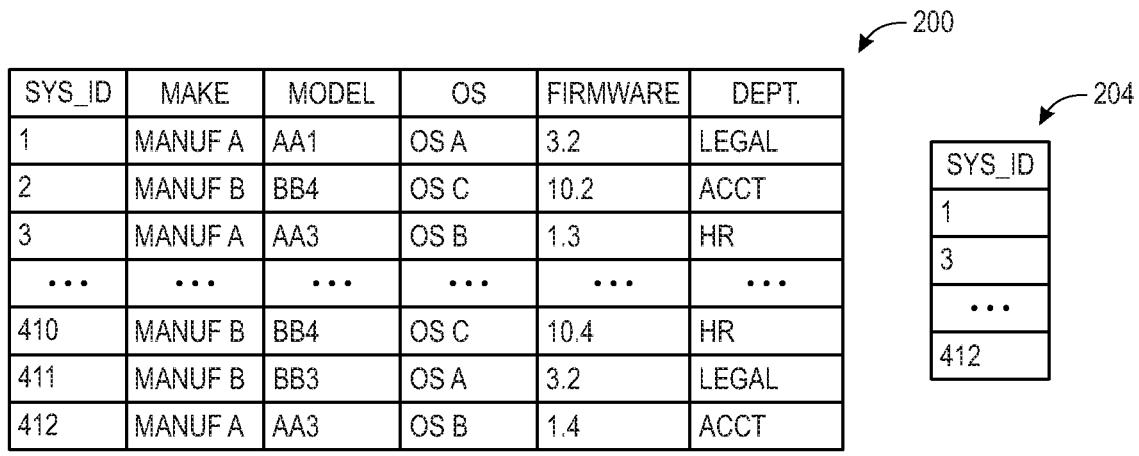
FIG. 3 is an example of a source table and term table, in accordance with aspects of the present disclosure.

An example of this approach is shown in FIG. 3, in which a source table 200 is depicted on the left of the figure. In this example, each record or row is indexed by a "sys_id" value and each record contains a make, model, operating system (OS), firmware version, and department. A term table 204 generated from the source table 200 is also depicted that lists only the "sys_id" of those records where the system make is identified as "Manuf A". In the depicted example, the term table 204 is depicted as having only a field that includes the index values of those records in the source table 200 meeting the specified criterion. In other embodiments, the term table 204 may include a second field having a separate unique index for the term table records.

Figure 4:
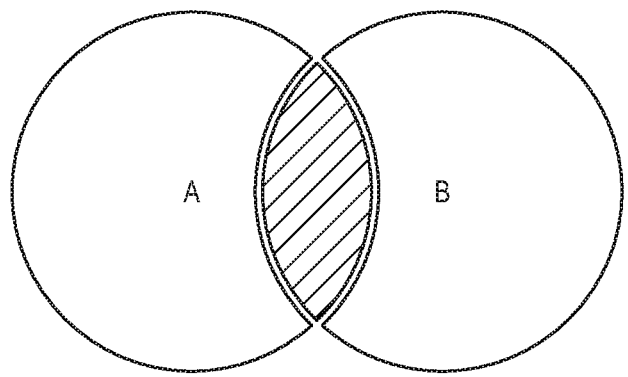
FIG. 4 is a graphical illustration of an inner join operation.

In accordance with the present approach, the term table 204 may be inner joined to the source table 200 to select only those records specified by a query specifying the value or criterion used to generate the term table 204. Turning to FIG. 4, a graphical representation of the manner in which an inner join operates is shown for two tables, Table A and Table B in accordance with the query:

SELECT * FROM TableA A INNER JOIN TableB B ON A.key=B.key

As shown in this example, the inner join effectively results in the selection of the intersection of Table A and Table B for the specified selection criterion. That is, only those records in both tables meeting the specified selection criterion are selected. Thus, as may be appreciated from this example, by performing an inner join of the term table 204 and source table 200, only those records of the source table 200 identified in the term table 204 are selected. This selection occurs without each row or record of the source table 200 being scanned.

Figure 5:
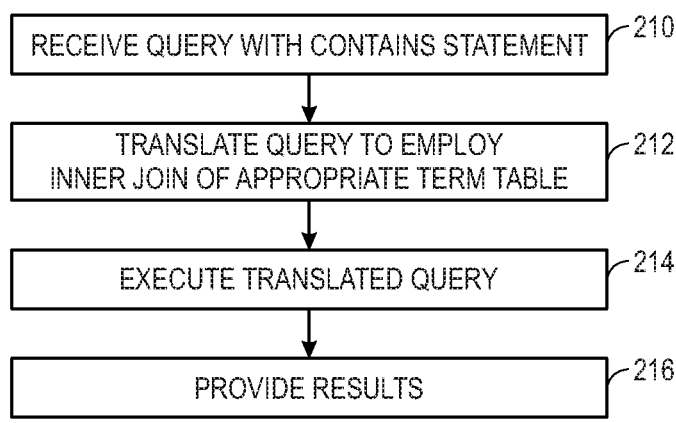
FIG. 5 is a flow diagram of an approach using inner joins to improve targeted element-value expressions, in accordance with aspects of the present disclosure.

Thus, turning to FIG. 5, where a query is identified as having CONTAINS(value) type terminology (step 210), such as:

WHERE field LIKE "% . . . %"

and where a term table 204 exists for the specified value (i.e., the term of interest), the query language may be parsed (step 212) to replace the CONTAINS(value) query language with an inner join to the term table 204 to cause the selection (step 214) of the specified records in an more efficient and quicker manner. Such modification or translation of the query language may be performed transparently to the user, such as within the application or database layers, so that the user can continue to generate or utilize queries having the CONTAINS or LIKE commands, without the query having to perform a full table scan to select the specified records, thus allowing query results to be returned (step 216) more quickly.

By way of example, for a test data set, the query:

```
mysql> SELECT count(*) AS recordcount
   FROM task task0
   WHERE task0.short_description like '%zboot%'
``` yielded a query result in 5.3 seconds. The reconfigured but equivalent query using a term table specific to the term "zboot" in the short_description field of the task0 table is:

```
mysql> SELECT count(*) AS recordcount
         FROM task task0
         INNER JOIN sys_term01
       yielded a result in 0.01 seconds.
```

Though a single term table 204 is shown by way of example in FIG. 3 and in the described examples, in practice, a separate term table 204 may be maintained for a range of commonly specified or selected values referenced by queries to a source table(s) 200. In this manner, the most commonly specified or selected terms used when querying a source table 200 may be represent within respective term tables 204, allowing querying these terms to be transparently translated to operate more efficiently and more rapidly.

Figure 6A:
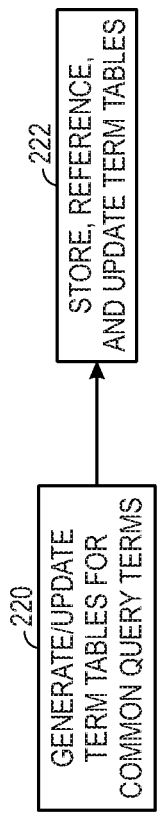
FIGS. 6A and 6B depict an example of a source table, multiple term tables, and a configuration table, in accordance with aspects of the present disclosure.
Figure 6B:
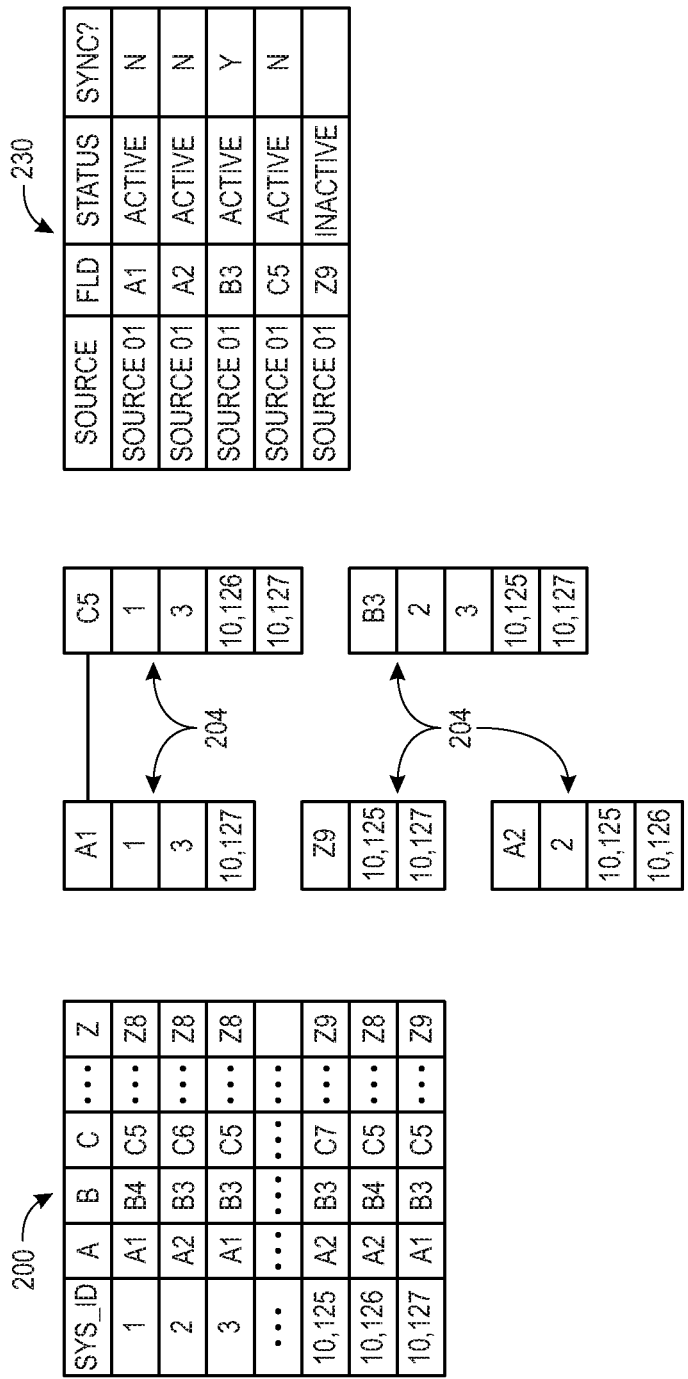

By way of example, and turning to FIGS. 6A and 6B, a source table 200 is depicted having an index field (sys_id) and a plurality of other fields (A through Z) for each record or row. A generate or update step 220 may be performed on a suitable system whereby common search terms in the different fields of the source table 200 are determined and corresponding term tables 204 for the terms of interest are generated and/or update or synchronized (step 222). The term tables 204 for these common query terms may be stored and used in subsequent query operations to improve the execution speed of queries specifying record having those terms by means of inner join operations.

By way of providing examples of these steps using example query language, an initial step in improving query performance may include creating separate term or lookup tables 204 (e.g., term tables sys_term01, sys_term02, sys_term03, and so forth) for one or more search terms where the only field in each term table 204 stores index values (e.g., sys_id) from the source table 200 that corresponds to records having the search term. In practice, this may be accomplished using a SQL command that creates the respective term table 204 and initially populates it using an INSERT command, such as:

```
INSERT INTO sys_term01 SELECT sys_id FROM task WHERE
   short_description LIKE '%zboot%'
``` in which the records of the term table sys_term01 are populated with the sys_id values of records or rows in the source table 200 in which the short_description field stores the text "zboot".

To maintain the usefulness of the term tables 204, the term table may be periodically or routinely synchronized to account for changes made to records in the source table 200, the addition of new records to the source table 200, and/or the deletion of records from the source table 200. For example, in a record update to the present source table corresponding to:

```
UPDATE task SET short_description = 'Please zboot my
   instance' WHERE sys_id = '0f34a'
``` a corresponding update to the respective term table sys_term01 may be made, such as via:
   INSERT INTO sys_term01 (sys_id) VALUES ('0f34a')
Similarly, in a deletion of a record from the present source table given by:
   DELETE FROM task WHERE sys_id='0f34a'
where the deletion is of a record having the term of interest (here "zboot") in the specified field, a corresponding update to the respective term table syst_term01 may be made, such as via:
   DELETE FROM sys_term01 WHERE sys_id='0f34a'

As may be appreciated, the usefulness of the term tables 204 in part depends on their remaining synchronized with the source table 200 and with an ability to track, manage, and reference which term tables 204 are available for utilization in query improvement. With this in mind, in certain implementation a term configuration table 230 may be provided which may be referenced to determine the availability and status of the term tables 204. In an example of such a configuration table 230, the configuration table may have an entry or record for each term table 204, with each record representing a single column of the source table or tables 204 and targeting a specific term. For example, an entry or record may exist for each of:

```
incident.short_description CONTAINS zboot
cmdb_model.display_name CONTAINS apple
cmdb.name CONTAINS db
```

The term configuration table 230 may be used in the administration and use of the term tables 204, such as to deactivate a term table 204 (such as where it is determined that queries perform more poorly using the term table than without) and/or to indicate a synchronization status of a referenced term table 204 (such as where the data in the term table does not currently match the source table). An example of a term configuration table 230 is provided in the example of FIGS. 6A and 6B.

While the preceding relates concepts pertaining to the first example of query speed improvement, FIGS. 7-11 depict an example of an interface that may be provided as part of user-guided creation of a term table for a routinely searched term. As will be appreciated, the depicted screens an interface merely represent one possible approach to facilitating user generation of a term table and the sequence of screens are believed to be useful in demonstrating the stages and processes that may be employed.

Figure 7:
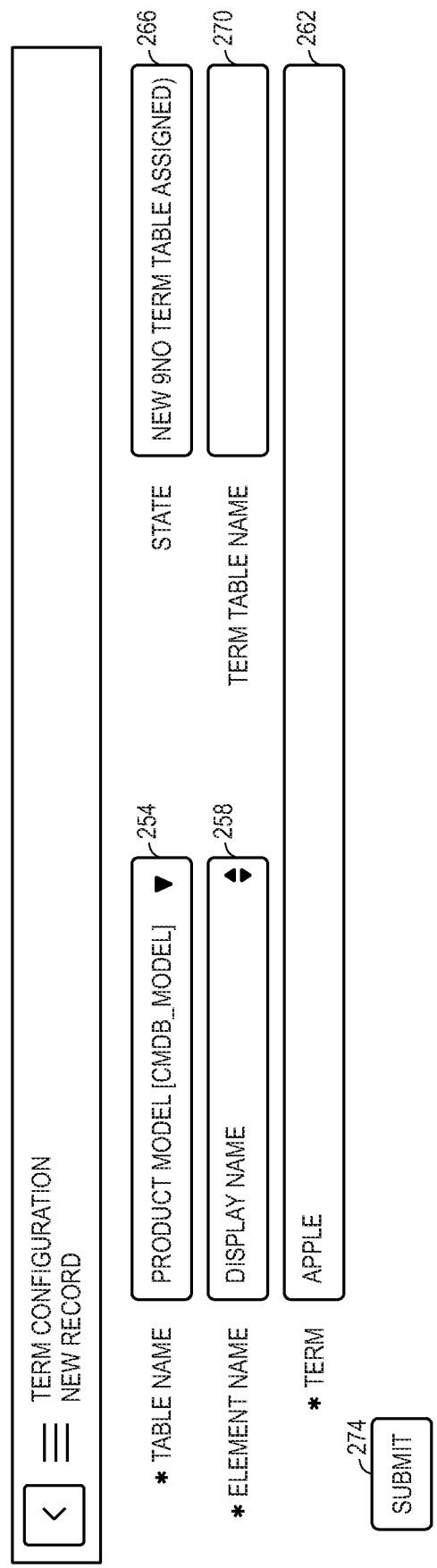
FIG. 7 is a first screenshot of a user-driven term table creation process, in accordance with aspects of the present disclosure.

Turning to FIG. 7, an initial view of a screen 250 is depicted for a term configuration process. As shown in FIG. 7, fields are provided in the interface for a user to specify the name of a source table (field 254), an element name or field name (field 258) present in the source table, and the term to be searched (field 262). Certain of these fields may be populated using dropdown menus or pop-up menus or, alternatively, by text entry. In the depicted example, informational fields showing the state of the term table (field 266) and the name of the term table being created or modified (field 270) are also shown. Here, the state of the term table is shown as New, with no table having yet been assigned. A submit button 274 is provided in this example, which can be selected when the source table, field or element, and search term are provided.

Figure 8:
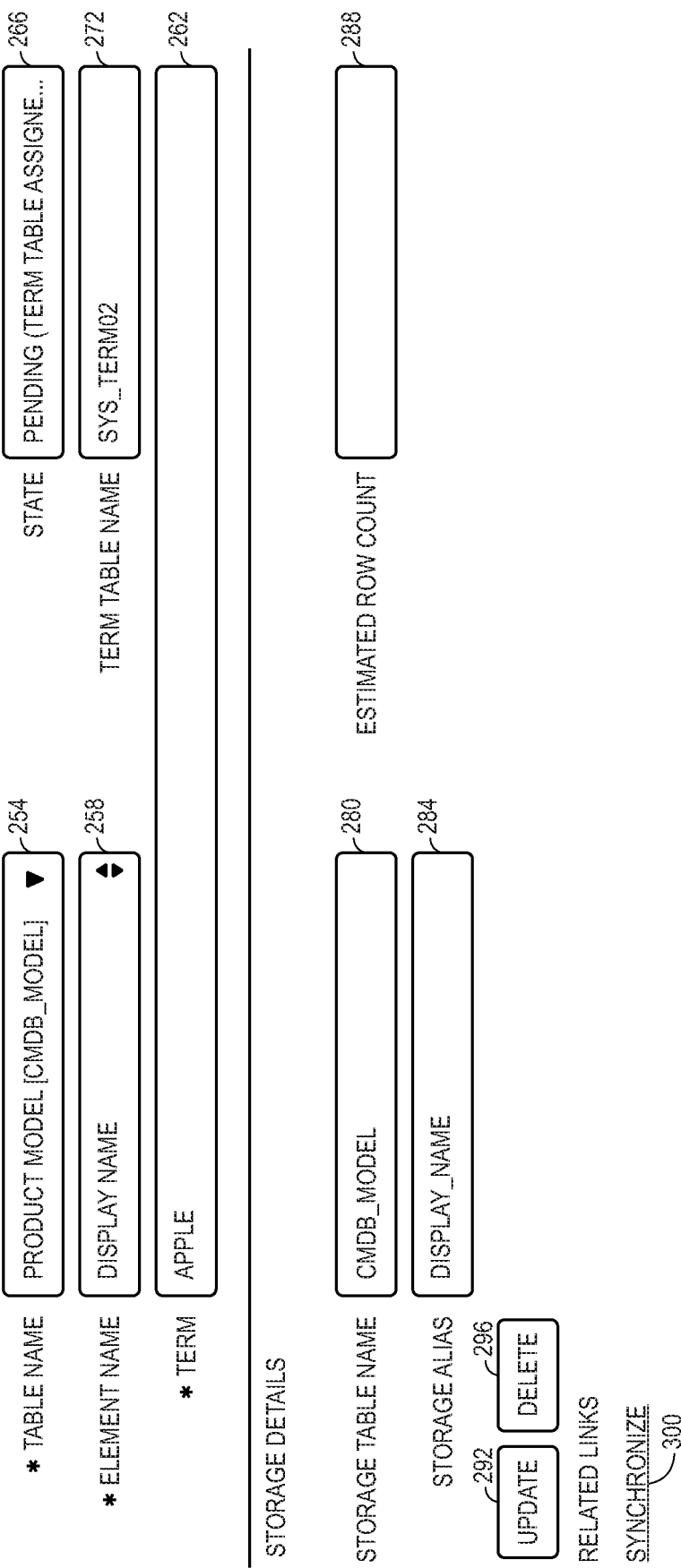
FIG. 8 is a second screenshot of a user-driven term table creation process, in accordance with aspects of the present disclosure.

Turning to FIG. 8, this figure depicts the screen 250 after the term table has been created in response to the selection of the submit button 276 of FIG. 7. As shown in FIG. 8, the provided source table, field or element, and search term are shown in their respective fields. In addition, the name of the newly generated term table (here sys_term02) is shown in the term table name field 270. The state of the term table is shown as Pending. In addition, FIG. 8 depicts storage details for the new term table, with fields for the storage table name (field 280), a storage alias (field 284), and the estimated row count (field 288). In the depicted example, an update button 292 is provided to allow a user to make changes to the storage details of the term table and a delete button 296 is provided to allow a user to delete the term table if desired. In addition, a synchronize option 300 is provided which, when selected, causes the term table to be populated.

Figure 9:
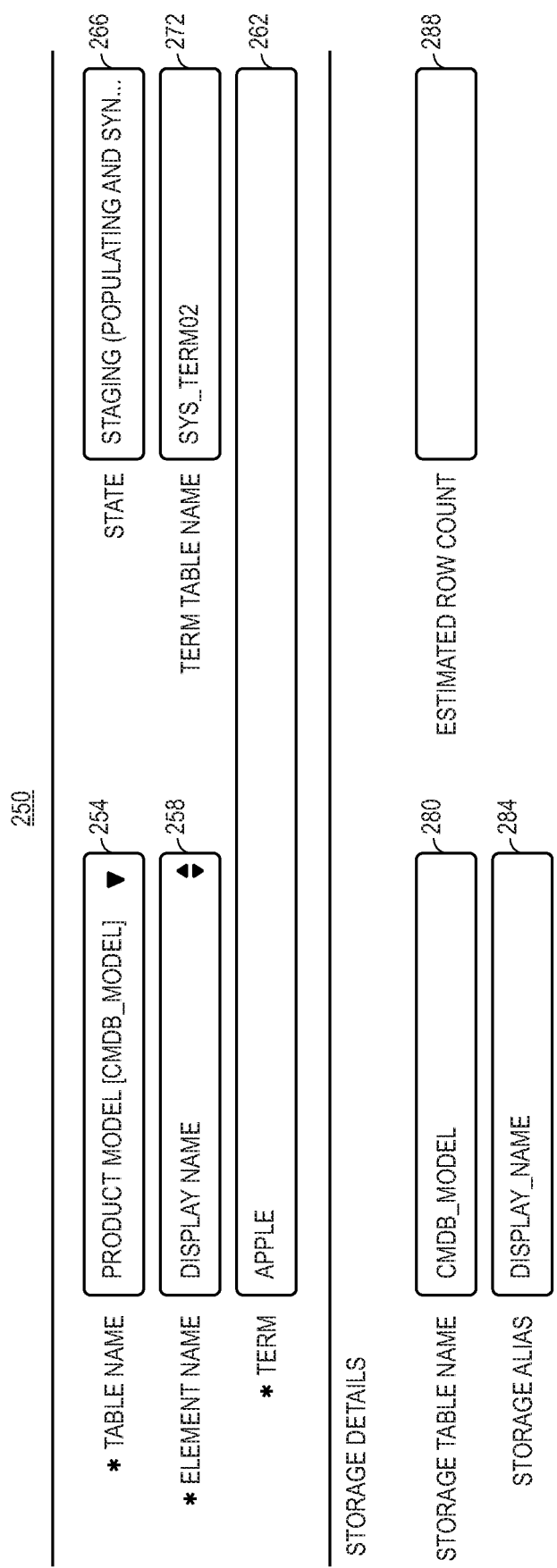
FIG. 9 is a third screenshot of a user-driven term table creation process, in accordance with aspects of the present disclosure.

Turning to FIG. 9, this figure depicts the screen 250 after the synchronization option of FIG. 8 is selected. As shown in FIG. 9, the state of the new term table is shown as Staging, during which the term table is populated and synchronized with the selected records of the source table.

Figure 10:
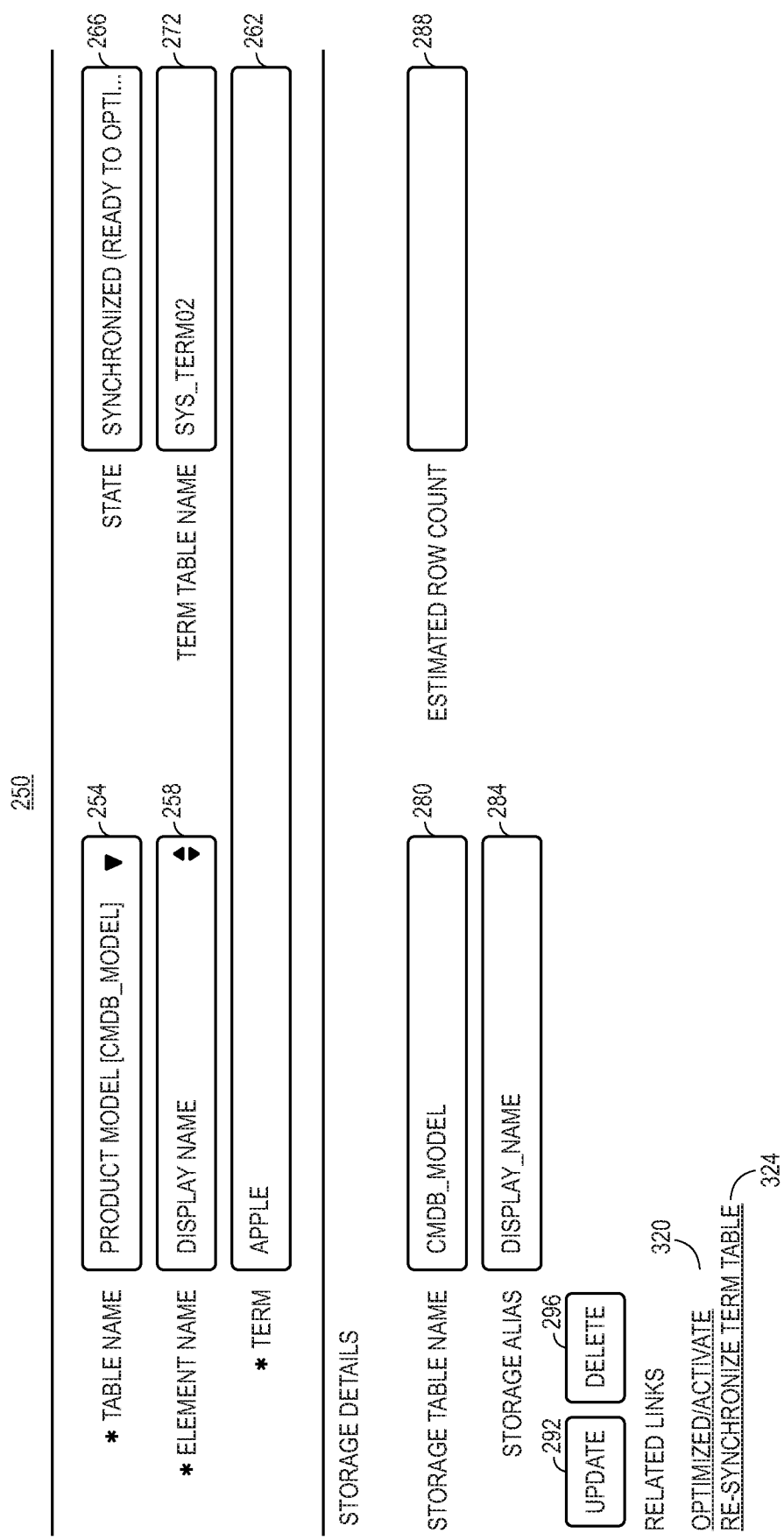
FIG. 10 is a fourth screenshot of a user-driven term table creation process, in accordance with aspects of the present disclosure.

Turning to FIG. 10, this figure depicts the screen 250 after the term table has been staged. As shown in FIG. 10, the provided source table, field or element, search term, term table name, term table state, storage table name, and storage alias are shown in their respective fields. The state of the term table after staging is shown as Synchronized. At this point, the new term table is populated and synchronized, however queries that reference the field and term in question (such as having a CONTAINS or LIKE statement referencing the specified element and term) are not yet optimized using the new term table. In the depicted example, the update button 292 and delete button 296 are once again provided to allow a user to modify the term table or its storage details or to delete the term table. In addition, an optimize/activate option 320 and a Re-synchronize option 324 are provided which, respectively, begin the query optimization process using the new term table or re-synchronize the new term table to account for changes in the source table.

Figure 11:
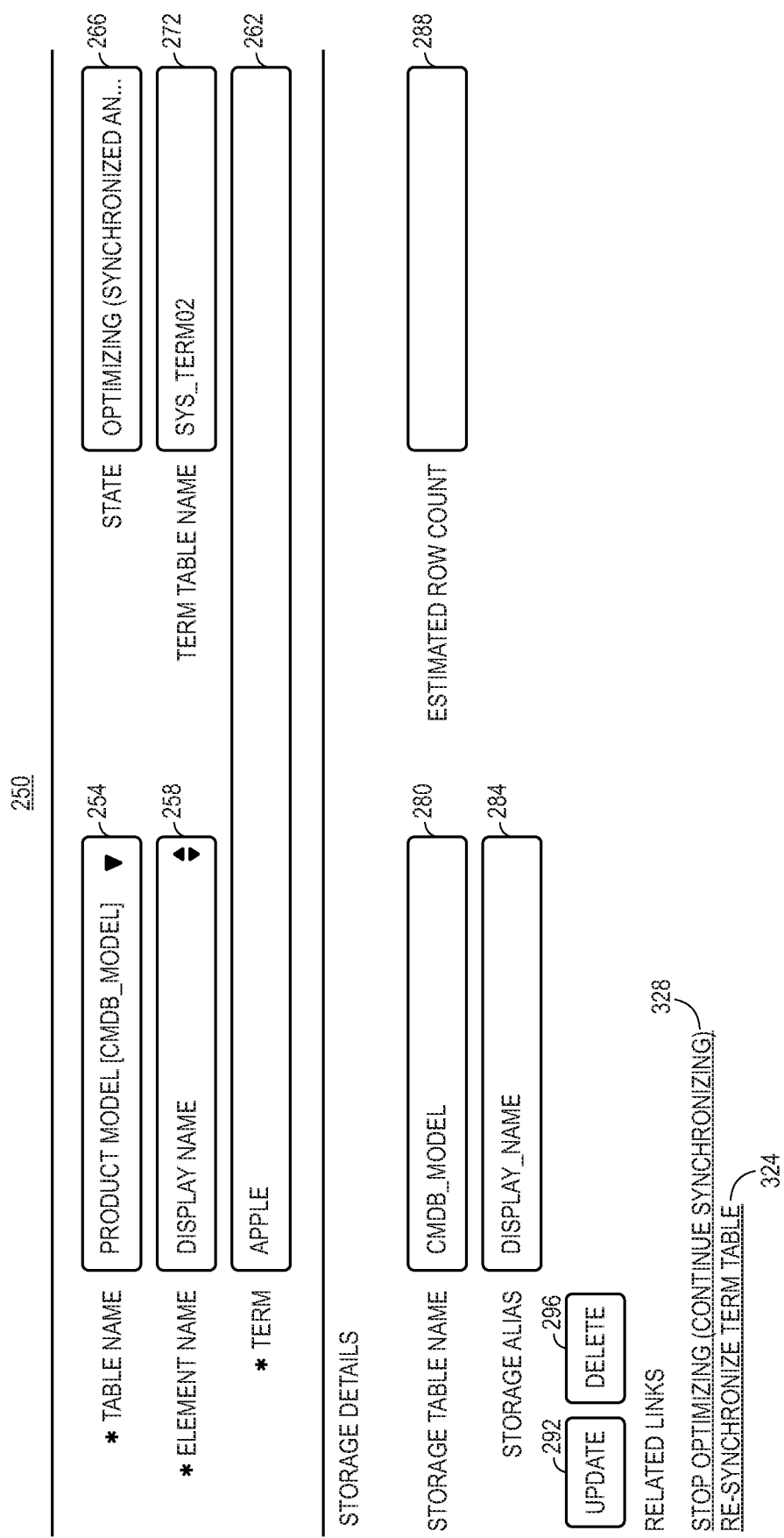
FIG. 11 is a fifth screenshot of a user-driven term table creation process, in accordance with aspects of the present disclosure.

Turning to FIG. 11, this figure depicts the screen 250 after the term table user has selected to optimize/activate queries using the new term table. As shown in FIG. 11, the provided source table, field or element, search term, term table name, term table state, storage table name, and storage alias are shown in their respective fields. The state of the term table is shown as Optimizing and at this point the application or database functionality may scan saved or stored queries for incidence of the of LIKE or CONTAINS type language that references the relevant source table, element field, and term. Such queries, when identified, may be rewritten or translated to incorporate an inner join of the new term table or may be flagged for on-the-fly optimization when executed. In the depicted example, the update button 292 and delete button 296 are once again provided to allow a user to modify the term table or its storage details or to delete the term table. In addition, a stop optimizing option 328 and a Re-synchronize option 324 are provided which, respectively, stop the query optimization process or re-synchronize the new term table to account for changes in the source table.

While the preceding enhancement to query functionality may be added to a database and/or application environment ad hoc, it may also be provided as part of a system, application, or database upgrade. By way of example, as part of an update or upgrade of an existing database, some number of term tables may be created. The term tables created may be determined based of historical report performance statistics, such as for queries run over the preceding three-, six-, or twelve-month period. Terms may be selected from queries executed over a relative or absolute threshold amount (i.e., frequently run queries) and/or queries which when executed take longer than a threshold duration (e.g., five seconds) to return a result. In such an upgrade process, queries that include a CONTAINS type term can also be identified for improvement.

Figure 12:
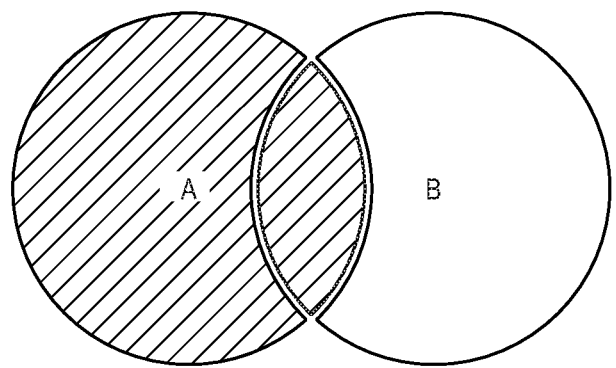
FIG. 12 is a graphical illustration of a left join operation.

In a second context, queries that include left joins are improved. Such left joins are performed on references or relationships with respect to a table (in contrast to inner joins, which are performed on tables in a hierarchy). By way of example, FIG. 12 depicts a graphical representation of the manner in which a left join operates using two tables, Table A and Table B in accordance with the query:

SELECT * FROM TableA A LEFT JOIN TableB B ON A.key=B.key

Figure 13:
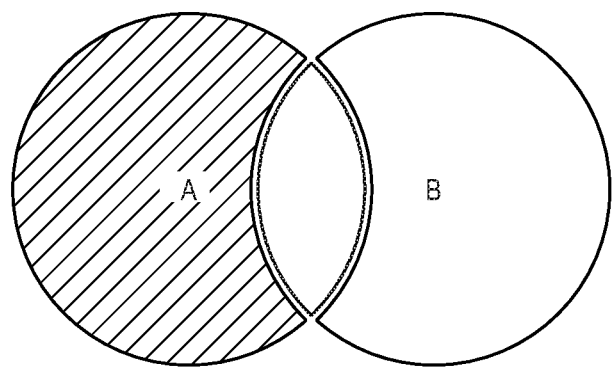
FIG. 13 is a graphical illustration of a left join operation omitting unmatched rows.

As shown in this example (which can be contrasted with the inner join example of FIG. 4), the left join effectively results in the selection of the records of Table A and those records of Table B also encompassed in Table A for the specified selection criterion. Similarly, FIG. 13 depicts a left join example in which unmatched rows are omitted from the results in accordance with the query:

```
SELECT * FROM TableA A LEFT JOIN TableB B ON A.key = B.key
WHERE B.Key IS NULL
```

Left joins are typically poorly optimized or not optimized by conventional database optimizers. In accordance with the present approach, to improve query performance a technique is provided whereby left joins are changed to inner joins without changing the query result.

In accordance with this approach, it is recognized that left join expressions may be characterized in two way: (1) as being required if the right side of the join (e.g., table B in the examples shown in FIGS. 12 and 13) might not match any rows, in which case the database fills in NULLS for those respective columns; and (2) as being implicitly an inner join if the query condition explicitly checks for NON-NULL values (and not applying an OR operation to a clause that explicitly checks for NULL values). With this in mind, left join expressions can be written or treated as inner join expressions when: (1) the target table is implicitly NON-NULL; and (2) the target table parent join(s) to the driving table are all also implicitly NON-NULL.

By way of a brief, code-based example, an initial query containing a left join may take the form of:

```
mysql> SELECT count(*) AS recordcount
    FROM task_sla task_sla0
    LEFT JOIN task task1 on task1.sys_id=task_sla.task
    WHERE task1.assignment_group = '6bdda77909d7'
``` which in this example takes 7.2 seconds to execute. This query may, in accordance with the present approach, this query may be re-written to replace the left join with an inner join, as:

```
mysql> SELECT count(*) AS recordcount
    FROM task_sla task_sla0
    INNER JOIN task task1 on task1.sys_id=task_sla.task
    WHERE task1.assignment_group = '6bdda77909d7'
``` which in this example takes only 0.01 seconds to execute.

However, as per the comments provided above, the left join cannot be replaced by an inner join for the following version of the query:

```
mysql> SELECT count(*) AS recordcount
    FROM task_sla task_sla0
    LEFT JOIN task task1 on task1.sys_id=task_sla.task
    WHERE task1.assignment_group = '6bdda77909d7'
    OR task1.assignment_group IS NULL
``` which instead takes 7.2 seconds to execute in this example.

With this in mind, in one implementation of the present approach each query is scanned before it is sent to the database to evaluate the respective query for left join expressions that may be replaced with inner joins. In one implementation, determination as to whether a left join expression is a candidate for replacement using an inner join may proceed as follows.

For a given query, a tree is generated from the query conditions, with the first query condition being the root node. Any AND expression is added to the current node and a branch to a child node occurs at either of an open parenthesis or an OR expression.

Once the tree is generated, the nodes may be traversed (i.e., walked along) to assess join expressions. Each node of the tree may be self-assessed from the expressions at the level of the node (i.e., ignoring child expressions) and may fall into one of three assessments: (1) no opinion (i.e., there are no expressions targeting the joined table); (2) must be a left join (i.e., the only expression against the joined table field is " . . . IS NULL"); or (3) is implicitly inner (i.e., has expression(s) targeting the joined table).

A node's self-assessment or self-opinion overrides any child-node assessments or opinions if it: (1) must be a left join; (2) is implicitly inner; or (3) has no child nodes. Otherwise (i.e., if the node has a self-assessment of "no opinion" and has children nodes) the join assessment for the node in question is derived from the respective child nodes. In this hierarchical analysis: (A) if any child node must be a left node (i.e., the only expression against the joined table field is " . . . IS NULL"), sibling node assessments are irrelevant and the node must be a left join; (B) if a child node is an OR expression, the node is: (1) implicitly inner if it has a sibling that is implicitly inner and does not have any siblings are no opinion nodes; otherwise (2) the child node is a no opinion node; or (C) otherwise: (1) the child node is implicitly inner if any sibling node is implicitly inner; or (2) otherwise, the child node is a no opinion node.

Figure 14:
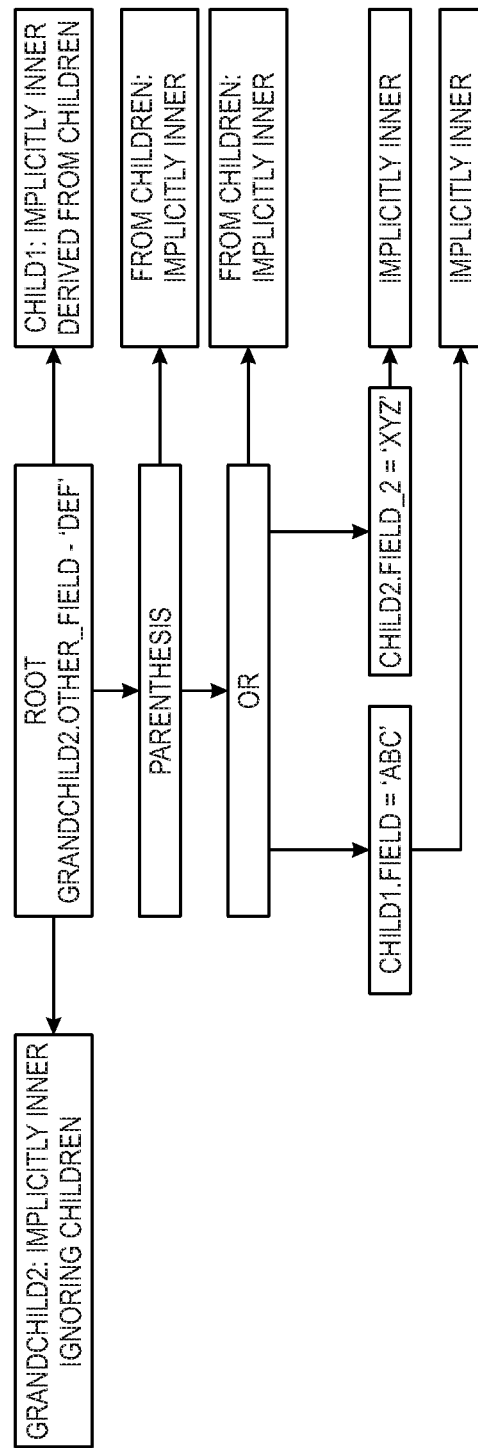
FIG. 14 depicts a join opinion tree of an optimizable example, in accordance with aspects of the present disclosure.
Figure 15:
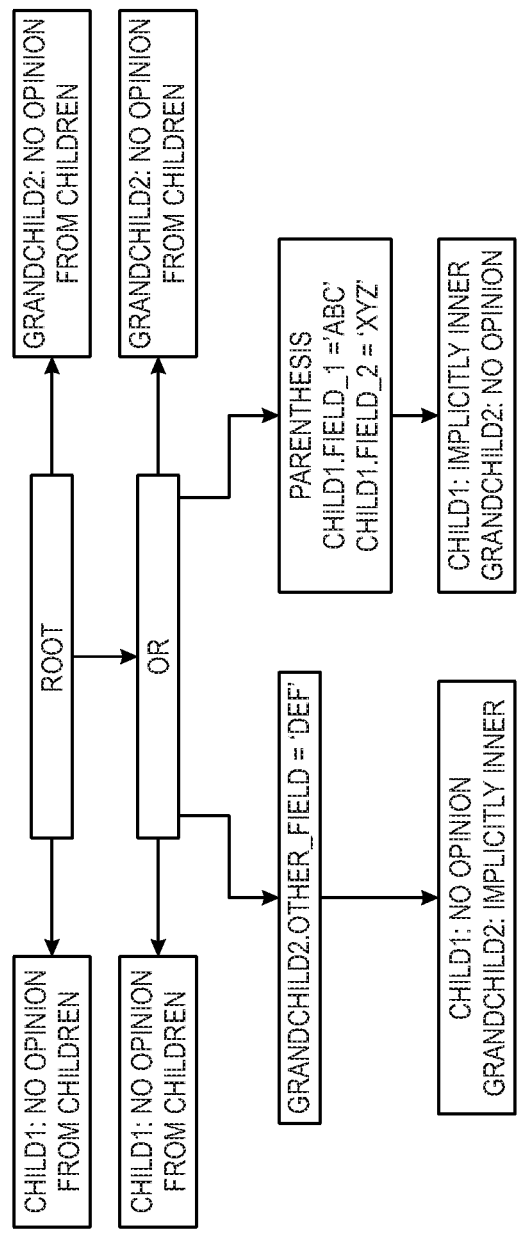
FIG. 15 depicts a join opinion tree of a non-optimizable example, in accordance with aspects of the present disclosure.

Examples of this process are provided in FIGS. 14 and 15. In FIG. 14, a tree analysis is illustrated of the optimizable query:

```
SELECT count(*) AS recordcount
FROM root root0
    LEFT JOIN child child1 ON root1.sys_id = child1.sys_id
    LEFT JOIN grandchild grandchild2 ON child1.sys_id = grandchild2.sys_id
WHERE (
    child1.field_1 = 'abc'
    OR child1.field_2 = 'xyz'
)
AND grandchild2.other_field = 'def'
``` is shown. At each level of the walk through, the nodes in question are determined to be implicitly inner, and the left join expressions may therefore be replaced with inner join expressions.

Conversely, in FIG. 15 a tree analysis is illustrated of the non-optimizable query:

```
SELECT count(*) AS recordcount
    FROM     root root0
        LEFT JOIN child child1 ON root1.sys_id = child1.sys_id
        LEFT JOIN grandchild grandchild2 ON child1.sys_id = grandchild2.sys_id
    WHERE grandchild2.other_field = 'def'
        OR(
```

```
        child1.field_1 = 'abc' AND
        child1.field_2 = 'xyz'
)
```

In this example, the left joins cannot be replaced by inner joins because either side of the OR has "no opinion" for either table.

In accordance with the preceding discussion, individual queries may be analyzed ad hoc or from a stored query set and enhanced by replacing left joins with inner joins in accordance with the guidelines set forth herein. By way of example, left join coercion to an inner join as described above may be on by default, parsing all queries that are submitted to the database. Queries in which such replacement occurs will typically be return a result to a user faster than queries in which the left joins are employed.

In a third context, queries with OR conditions are improved.

By way of example, in one implementation, a simple query may contain top-level OR conditions against different reference fields. Such a query can be re-written into multiple, simpler queries with an overall improvement to processing throughput. By way of example, the query:

select count(*) from task where caller_id=X OR opened_by=X can be rewritten using a UNION of two simpler expression:

```
select count(*)
from (
    select sys_id from task where caller_id=X
    UNION
    select sys_id from task where opened_by=X
)
``` which will execute more quickly and generate the same output.

In a more complex scenario, the OR condition may include random sets of conditions or blocks across one or more ORs. In such a scenario, it may be beneficial to rewrite the query into more, but simpler, queries, which is a generalization of the preceding example of the simpler reference field OR case. By way of example, if a query consists of a multiple OR conditions, it can be broken down into one query per top-level OR. Individual keys can exist in multiple sub-groups or queries. A UNION operation may be employed to eliminate duplicates.

For example, the query:

```
SELECT count(*)
    FROM task WHERE (filter1) OR (filter2) OR (filter3)
``` can be rewritten as a sequence of UNION expressions:

```
SELECT count(*)
FROM
(
SELECT sys_id FROM task WHERE (filter1)
UNION SELECT sys_id FROM task WHERE (filter2)
UNION SELECT sys_id FROM task WHERE (filter3)
)
``` which is more efficient to execute and provides greater throughput. By way of example, the query:

```
SELECT task0.'sys id' FROM task task0 WHERE task0.'sys_class_name' =
'incident' AND ((task0.'active' = 1 AND task0.'state' IN (-40 , 2) AND
task0.'admin_override' = 1 AND task0.'assignment_group' =
'ef170758584120006863f2dea01f7f1c') OR (task0.'active' = 1 AND
task0.'state' IN (-41) AND task0.'u_user_priority' = '0 - Outage' AND
task0.'assignment_group' = 'ef170758584120006863f2dea01f7f1c' AND
task0.'u_action_needed' = 1 AND task0.'admin_override' = 0) OR
(task0.'active' = 1 AND task0.'state' IN (-40 , 2) AND
task0.'u_user_priority' = '0 - Outage' AND task.'assignment_group' =
'ef170758584120006863f2dea01f7f1c')) AND (task0.'sys_domain_path' = '/'
OR task0.'sys_domain_path' LIKE '!!!/!!#/!!$/%' OR
task0.'sys_domain_path' LIKE '!!!/!!!/%') ORDER BY
task0.'u_user_priority' limit 0,20
``` executes in 18.75 seconds. But when re-written with UNION expressions as:

```
SELECT 'sys_id'
from (
SELECT task0.'sys_id',task0.'u_user_priority'
FROM task task0
WHERE
task0.'sys_class_name' = 'incident'
  AND task0.'active' = 1
  AND task0.'state' IN (-40 , 2)
  AND task0.'admin_override' = 1
  AND task0.'assignment_group' ='ef170758584120006863f2dea01f7f1c'
  AND (task0.'sys_domain_path' = '/' OR task0.'sys_domain_path' LIKE
'!!!/!!#/!!$/%' OR task0.'sys_domain_path' LIKE '!!!/!!!/%')
union
SELECT task0.'sys_id',task0.'u_user_priority'
FROM task task0
WHERE
task0.'sys_class_name' = 'incident'
  AND task0.'active' = 1
  AND task0.'state' IN (-41)
  AND task0.'u_user_priority' = '0 - Outage'
  AND task0.'assignment_group' ='ef170758584120006863f2dea01f7f1c'
  AND task0.'u_action_needed' = 1
  AND task0.'admin_override' = 0
  AND (task0.'sys_domain_path' = '/' OR task0.'sys_domain_path' LIKE
'!!!/!!#/!!$/%' OR task0.'sys_domain_path' LIKE '!!!/!!!/%')
union
SELECT task0.'sys_id',task0.'u_user_priority'
FROM task task0
WHERE
task0.'sys_class_name' = 'incident'
  AND task0.'active' = 1
  AND task0.'state' IN (-40 , 2)
  AND task0.'u_user_priority' = '0 - Outage'
  AND task0.'assignment_group' = 'ef170758584120006863f2dea01f7f1c'
  AND (task0.'sys_domain_path' = '/' OR task0.'sys_domain_path' LIKE
'!!!/!!#/!!$/%' OR task0.'sys_domain_path' LIKE '!!!/!!!/%')
)t
ORDER BY 'u_user_priority'
limit 0,20;
executes in 0.07 seconds.
```

As discussed above, the preceding enhancement to query functionality may be added to a database and/or application environment ad hoc, it may also be provided as part of a system, application, or database upgrade. By way of example, as part of an update or upgrade of an existing database, queries containing an OR expression may be rewritten to improve performance using UNION statements. As in the preceding example, a historical query log may be used to identify queries with OR expressions that run slowly, such as queries run in the last three months that take longer than one second to return a result having a count of ten or greater and where the respective query contains an OR expression. If part of an upgrade or database enhancement project, some set number of queries, such as the top 50, 100, 200 queries meeting these or similar criteria, may be selected for re-writing. When re-written, the execution speed of the optimized queries may be compared to the un-optimized speed and if there is no improvement or the improvement is less than a specified threshold, the non-optimized query may continue to be employed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
at least one processor configured to execute instructions from at least one memory to cause the system to perform operations comprising:
receiving or accessing a query from a database;
determining that the query contains one or more OR expressions;
generating a modified query from the query, wherein the modified query includes a respective subquery for at least a portion of the one or more OR expressions and includes one or more UNION operations configured to combine the results of each respective subquery while removing duplicate records;
determining a run time of the modified query and a historical run time of the query in the database; and
replacing the query with the modified query in the database in response to the run time of the modified query being less than the historical run time of the query.

2. The system of claim 1, wherein each respective subquery corresponds a top-level OR expression.

3. The system of claim 1, wherein the at least one processor is configured to execute the instructions to cause the system to perform operations comprising:
receiving the query as an ad hoc query from a user;
executing the modified query to generate a result set; and
providing the result set to the user, wherein the modifying of the query is transparent to the user such that the user does not know that the modified query has been generated and executed.

4. The system of claim 1, wherein the query is a stored database query of a plurality of stored queries of the database.

5. The system of claim 4, wherein the at least one processor is configured to execute the instructions to cause the system to perform operations comprising:
determining that a second query of the plurality of stored queries contains one or more OR expressions;
generating a second modified query from the second query, wherein the second modified query includes a respective subquery for at least a portion of the one or more OR expressions of the second query and includes one or more UNION operations configured to combine the results of each respective subquery of the second modified query while removing duplicate records; and
storing the second modified query in the at least one memory.

6. The system of claim 4, wherein the system comprises a database system configured to store the database in the at least one memory.

7. A method, comprising:
determining that a query contains a first top-level OR expression having at least a first set of conditions and a second set of conditions and contains a second top-level OR having a third set of conditions, and in response:
generating a modified query from the query, wherein the modified query includes a first subquery having the first set of conditions, a second subquery having the second set of conditions, and a first UNION operation configured to combine results of the first subquery and the second subquery while removing duplicate records, and wherein the modified query further includes a third subquery having the third set of conditions, and a second UNION operation configured to combine a result of the first UNION operation and the third subquery while removing duplicate records; and
storing the modified query.

8. The method of claim 7, wherein the first set of conditions or the second set of conditions comprises a condition in which a specified field has a specified value or in which the specified field has a specified pattern using a LIKE expression.

9. The method of claim 7, wherein the first set of conditions or the second set of conditions include a plurality of conditions and include at least one of: an AND expression or a lower-level OR expression.

10. The method of claim 7, wherein the query comprises an aggregate function that calculates a value using records that satisfy the first set of conditions or the second set of conditions.

11. The method of claim 10, wherein the modified query comprises the aggregate function and calculates the value from records returned by the first UNION operation of the results of executing the first subquery and the second subquery.

12. The method of claim 7, wherein the query is one of a plurality of queries stored in a database, and wherein the method is performed as part of a database upgrade process of the plurality of queries.

13. The method of claim 12, comprising:
determining a historical run time of the query in the database;
executing the modified query to determine a run time of the modified query; and
replacing the query with the modified query in the database in response to the run time of the modified query being less than the historical run time of the query.

14. The method of claim 13, wherein a difference between the historical run time of the query and the run time of the modified query is greater than a predefined threshold.

15. The method of claim 13, comprising:
determining that a second query of the plurality of queries contains an expression specifying a field and a value within a source table of the database, and in response:
identifying a term table specific to the field and the value, wherein the term table comprises a number of records corresponding to an incidence of the value within the field within the source table, and wherein the term table comprises a column storing index values for each record in the source table having the value in the field;
generating a second modified query that includes an INNER JOIN operation of the term table and the source table configured to generate a result set containing only the records from the source table having the value in the field; and
storing the second modified query.

16. The method of claim 13, comprising:
determining that a second query of the plurality of queries contains a LEFT JOIN operation that is implicitly an INNER JOIN operation, and in response:

generating a second modified query from the second query that replaces the LEFT JOIN operation with the INNER JOIN operation; and storing the second modified query.

17. At least one non-transitory computer-readable medium at least collectively storing instructions executable by a processor of a computing system to upgrade a database, the instructions comprising instructions to:

identify a plurality of queries of the database;

for each query of the plurality of queries:

determine that the query contains an OR expression having at least a first set of conditions and a second set of conditions, and in response:

generate a modified query from the query, wherein the modified query includes a first subquery having a first WHERE expression with the first set of conditions, a second subquery having a second WHERE expression with the second set of conditions, and a UNION operation that is configured to combine results of the first subquery and the second subquery while removing duplicate records; and determine a historical run time of the query in the database;

execute the modified query to determine a run time of the modified query; and replace the query with the modified query in the database in response to the run time of the modified query being less than the historical run time of the query by at least a predetermined amount.

18. The medium of claim 17, wherein the plurality of queries is identified by having respective historical run times greater than a predefined length of time.

\* \* \* \* \*